Figure 1:
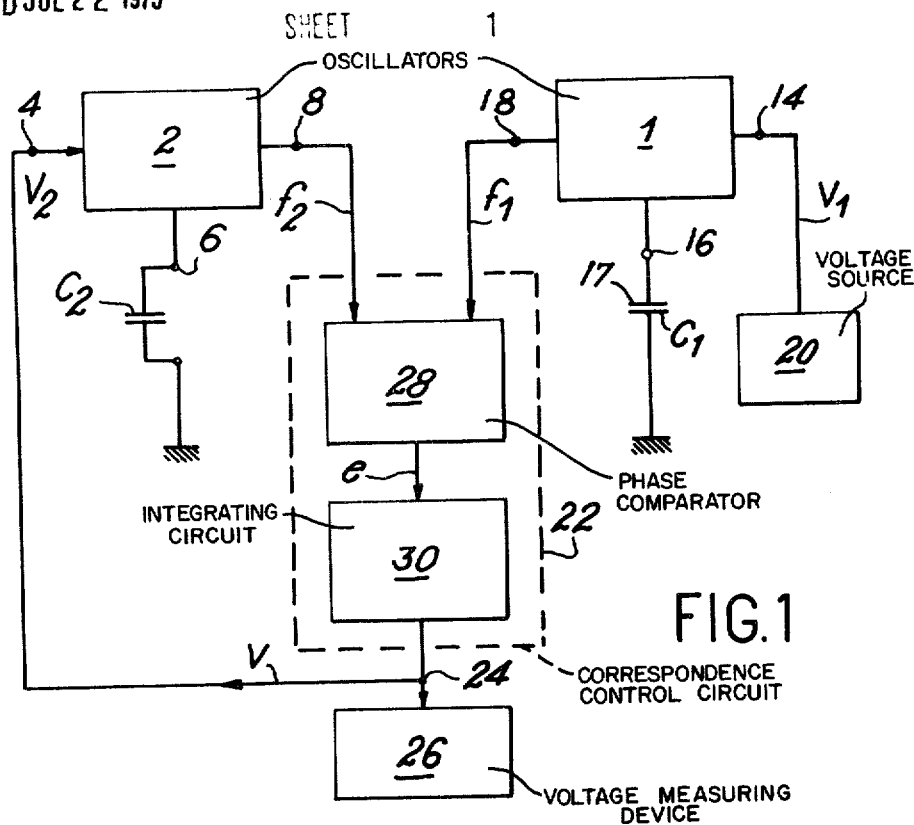

United States Patent [19]
Delafon

[11] 3,896,374
[45] July 22, 1975

[54] METHOD OF ANALOG MEASUREMENT OF A CAPACITANCE AND A CAPACITANCE METER FOR CARRYING OUT SAID METHOD

[75] Inventor: Patrick Delafon, Seyssinet, France

[73] Assignee: Commissariat a l'Energie Atomique, Seyssinet, France

[22] Filed: Nov. 23, 1973

[21] Appl. No.: 418,300

[30] Foreign Application Priority Data
Nov. 29, 1972 France .............................. 72.42467

[52] U.S. Cl. ............................................. 324/60 C
[51] Int. Cl. ............................................ G01r 27/26
[58] Field of Search ......................... 324/60 R, 60 C

[56] References Cited
UNITED STATES PATENTS

| | | | |
|---|---|---|---|
| 2,940,037 | 6/1960 | Lide | 324/60 C |
| 3,325,727 | 6/1967 | Haas | 324/60 C |
| 3,487,300 | 12/1969 | Merrell | 324/60 R |
| 3,626,285 | 12/1971 | Hartke | 324/60 R |

Primary Examiner—Stanley T. Krawczewicz
Attorney, Agent, or Firm—Lane, Aitken, Dunner & Ziems

[57] ABSTRACT

A method of analog measurement of a capacitance and/or a variation of capacitance which entails the use of a capacitance meter comprising two oscillators whose frequency is dependent on the capacitances introduced in the oscillator circuits and on a control voltage and in which the unknown capacitance is connected in one of said circuits, thereby modifying its frequency. The control voltage of either of the two oscillators is modified so as to reduce their frequency difference to zero, then measured by a voltmeter and the value of capacitance is deduced therefrom.

17 Claims, 8 Drawing Figures

METHOD OF ANALOG MEASUREMENT OF A CAPACITANCE AND A CAPACITANCE METER FOR CARRYING OUT SAID METHOD

This invention relates to a method of analog measurement of a capacitance and/or a variation of capacitance and a capacitance meter for carrying out said method. The invention finds numerous applications, especially in the metrology of capacitors and in the measurement of any physical phenomenon which can be represented by a capacitance or a variation of capacitance.

There are many known methods of measuring a capacitance. The method of measurement of impedance can be employed in order to obtain a broad range of measurement and a direct reading. Thus, if the capacitor whose capacitance C is to be measured is inserted in a circuit in which are connected in series on the one hand a voltage source $e$ having an angular frequency $w$ and on the other hand a resistor $r$ of low value, the voltage $u$ developed across the terminals of said resistor is of the form $u \approx reCw$ if the resistance drop within the resistor $r$ is disregarded. The peak voltage at the terminals of the resistor is therefore proportional to the capacitance $C$ to be measured. A method of this type necessarily results in very low voltages $u$ since the resistor $r$ itself has a very low value of resistance. It is therefore necessary to amplify the output signal before rectifying this latter. Moreover, the measured voltage $u$ is proportional to $w$, with the result that a precision of the order of $5 \times 10^{-4}$ can be obtained only by making use of an oscillator having a frequency which is fixed to within a few times $10^{-4}$. Similarly, since $u$ is proportional to $e$, a precision of this order can be obtained only be resorting to the use of an oscillator having an amplitude which is fixed to within a few times $10^{-4}$. The change of range in this method is obtained by changing the frequency and this makes it necessary to ensure in addition that the entails is of the switchable-frequency type. In fact, this method entails the need to measure the complex impedance of the capacitor and the leakages of this latter. If said leakages are of high value (capacitor of the electrochemical type or in which the dielectric is imperfect), the degree of error is not negligible. Finally, in circuits designed to carry out a method of this type, the capacitor in which the value of capacitance it to be measured does not have a grounded plate. This is very inconvenient, especially for low values of capacitance since in this case electrical disturbances can easily have an influence on the measurement. The disadvantages of this method are therefore extremely numerous.

Another known method consists in heterodyning and accordingly calls for the use of two oscillators, one of which has a fixed frequency $F_1$ whilst the other has a frequency $F_2$ which is a linear function of the capacitance C of the capacitor which is connected to said oscillator. The signals emitted by the two oscillators are multiplied, thereby producing two signals at the frequencies $F_1 + F_2$ and $F_1 - F_2$. Filtering makes it possible to select the component at the frequency $F_1 - F_2$. This frequency is proportional to the value C to be measured. It is then only necessary to process the information represented by said difference in frequency, especially by means of a counting technique, in order that numerical information representing the value C may thus be extracted therefrom. The disadvantages of such a method and of the capacitance meters which serve to carry out this latter lie partly in the fact that, in the case of low values of capacitance to be measured, the differences in frequencies $F_1 - F_2$ are small, with the result that processing of the signal at this frequency is time-consuming and that there is a real danger of drift and synchronization of oscillators. As a general rule, these devices consequently have only a single measuring range in the case of low values of capacitance below which the oscillators pull into step. These methods give rise to a further difficulty in obtaining the term $F_1 - F_2$, which calls for multiplication of the signals having frequencies $F_1$ and $F_2$ and then for filtering of the result. These operations are carried out by analog computation in heavy and cumbersome devices. Moreover, the low value obtained in respect of $F_1 - F_2$ usually makes it necessary to perform an additional multiplication in order to bring the frequency to a value which can readily be processed, with the result that the complexity of the circuit is further increased.

Another known method makes use of two oscillators for the purpose of measuring capacitances. This method consists in counting during a time interval $t$ the number of zero-crossings of the signal derived from an oscillator having a frequency $F_1$, then in counting-down during the same time interval $t$ the number of zero-crossings of the signal derived from an oscillator having a frequency $F_2$ which is proportional to the capacitance C of a capacitor which is connected to this second oscillator. There is accordingly obtained a number which is proportional to $F_2 - F_1$, that is to say to C. In general, the oscillators employed are of the LC type and their frequency is related to C by a law of the form $\sqrt{LC}$. This law can be considered as linear only if C varies only slightly, which limits the range of utilization. The major drawback of this method lies in the fact that an analog value is not provided at the output of the capacitance meter but only a numeral value.

Merely for the sake of reference, there can be mentioned the methods of measurement of capacitance which make use of bridges (Sauty bridge, Wien bridge, Maxwell bridge and so forth). These methods are difficult and take a very long time to perform.

The present invention is precisely directed to a method of measurement of capacitance of the type which makes use of two electric oscillators, the frequency of which is dependent on the capacitors connected in the circuit of said oscillators, and a capacitance meter which carries out said method and circumvents the disadvantages of known devices, especially insofar as it has outstanding properties of linearity and precision as well as the advantage of providing an analog output. Moreover, the capacitance meter in accordance with the invention has a wide range, is simple to use and inexpensive to produce since it employs commercially available components.

More precisely, this invention is directed to a method of analog measurement of a capacitance and/or a variation of capacitance, in which use is made of two electric oscillators whose frequency is dependent on a capacitance connected thereto and in which the unknown capacitance is connected in the circuit of one of the oscillators, characterized in that:

— two oscillators are chosen and the frequency of these latter is dependent both on the capacitance introduced in their circuit and on a control voltage, — the two oscillators are initially adjusted so as to ensure that their frequencies are equal,
— the capacitance to be measured is connected in the circuit of one of the oscillators, thereby modifying its frequency,
— the control voltage of either of the two oscillators is modified so as to reduce the frequency difference between the two oscillators to zero,
— said control voltage as thus modified is measured and the value of said capacitance is deduced therefrom.

A preferred arrangement consists in applying a fixed control voltage to the first oscillator and in connecting a capacitance standard in its circuit ; the frequency of said first oscillator is then fixed and taken as a reference. The capacitance to be measured is subsequently connected in the circuit of the second oscillator and the control voltage of the second oscillator is then modified so as to bring the frequency of said oscillator to the reference frequency of the first oscillator. A measurement of the control voltage of the second oscillator provides the analog measurement of the unknown capacitance. It is found preferable to provide a correspondence control system for equalizing the frequencies of the two oscillators.

The invention is also directed to a capacitance meter which serves to carry out the method hereinabove defined and is of the type comprising two oscillators whose frequencies are dependent on the capacitances which are present in the circuit of said oscillators, characterized in that it comprises :

— two oscillators each having at least two inputs, one of which is a voltage control input and the other is a capacitance control input, and one output which delivers signal whose frequency is dependent on the voltage applied to the voltage control input and on the capacitance connected to the capacitance control input,
— a correspondence control circuit for controlling the frequency of either of the oscillators in dependence on the frequency of the other oscillator and connected to the outputs of both oscillators, the output of said circuit being intended to deliver a voltage which is the control voltage for the frequency-controlled oscillator,
— a voltmeter for measuring said control voltage which is supplied by said correspondence control circuit.

The first oscillator is preferably controlled by a fixed voltage source and a capacitance standard is connected to the corresponding control input ; the frequency of said oscillator is then fixed and constitutes a reference by which the frequency of the second oscillator is dependently controlled.

Figure 2:
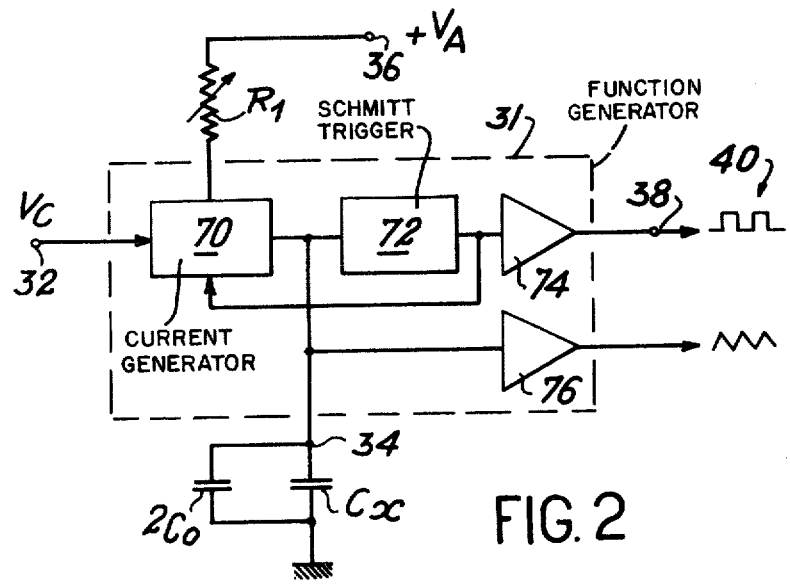
Figure 3:
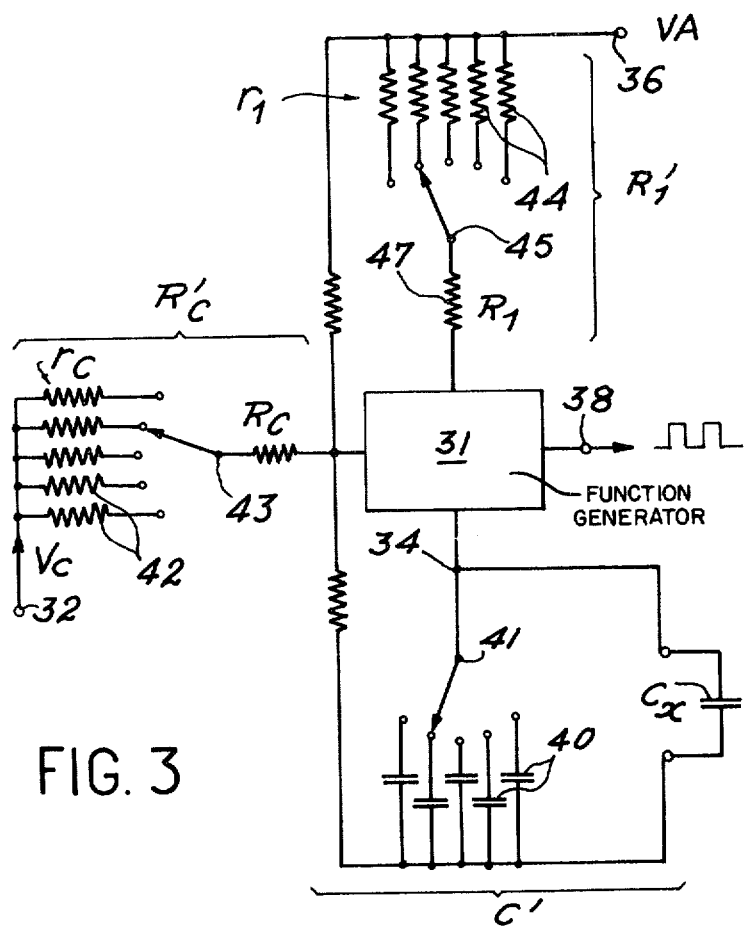
Figure 4:
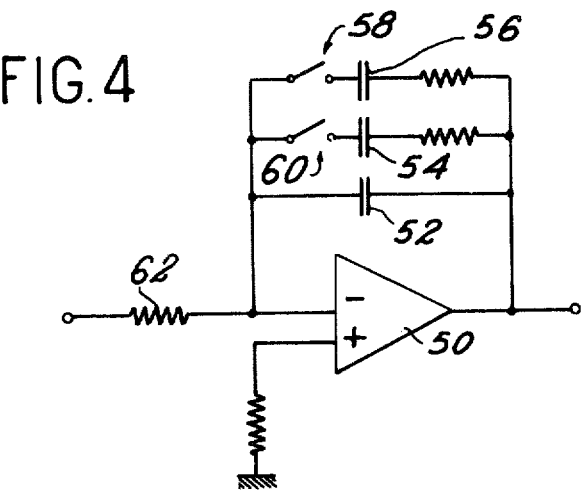
Figure 5:
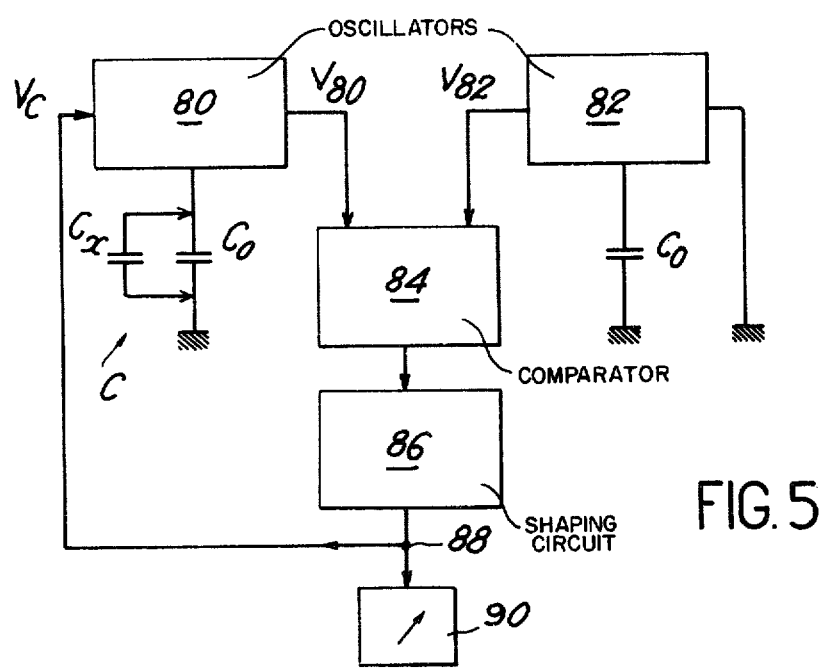
Figure 6:
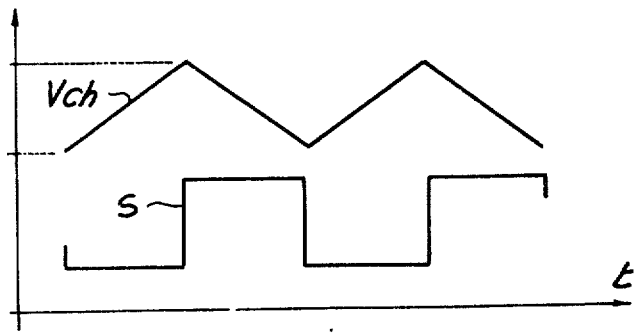
Figure 7:
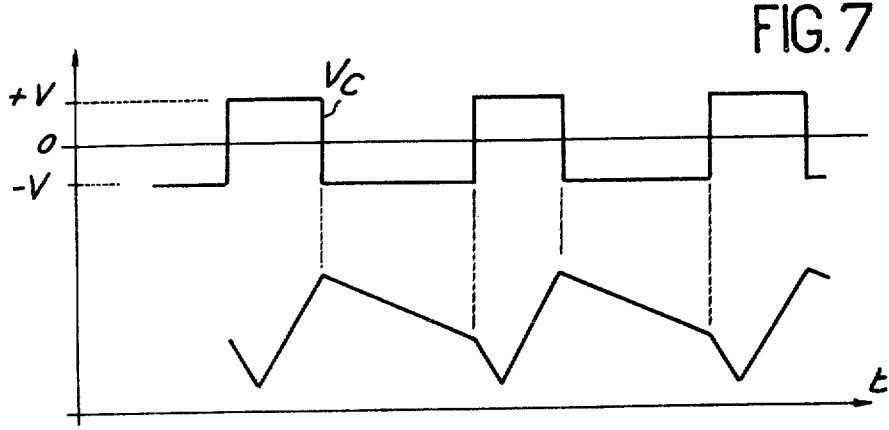
Figure 8:
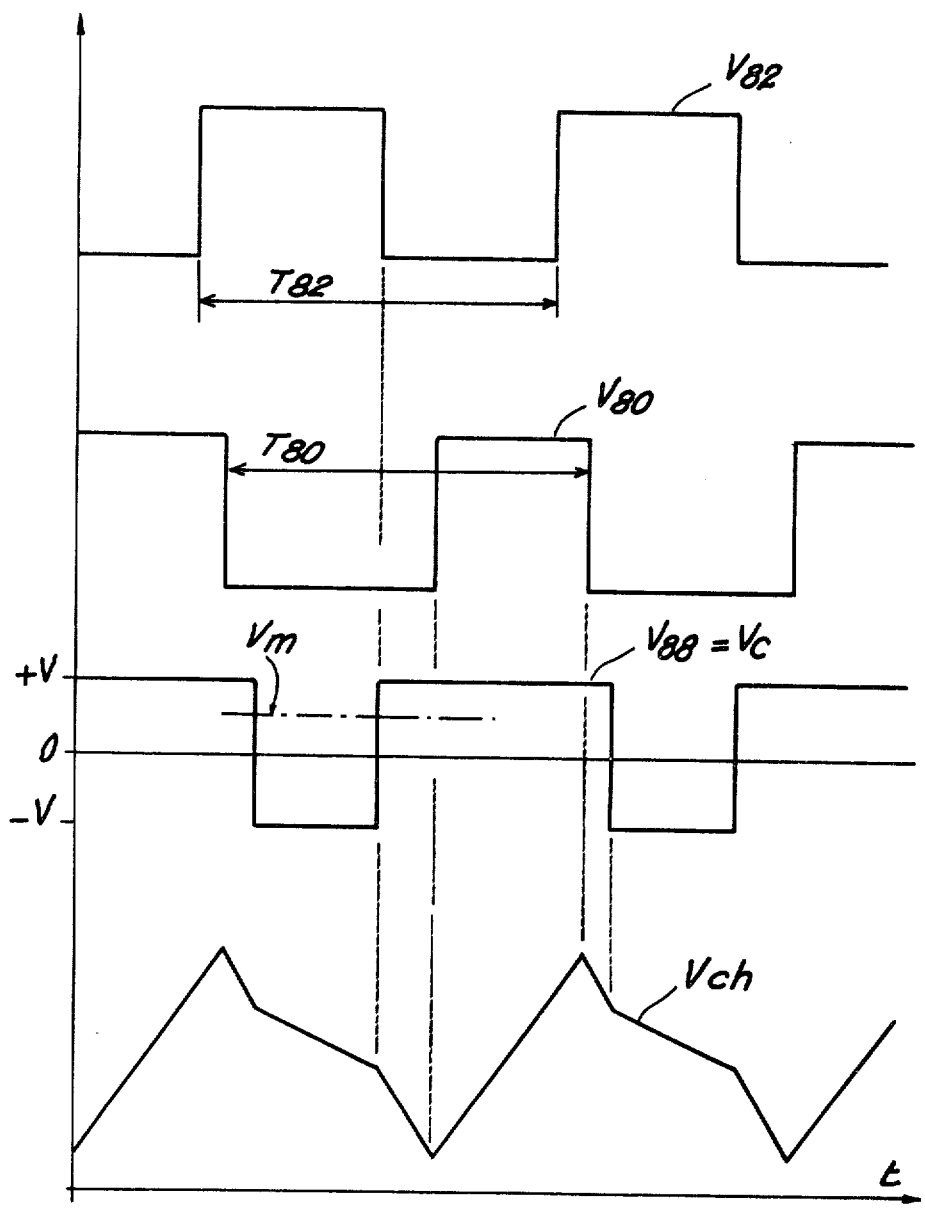

The characteristic features and advantages of the invention will in any case become more readily apparent from the following description of one exemplified embodiment corresponding to the case in which the first oscillator is controlled by fixed elements and constitutes a reference oscillator. Consideration will be given to the accompanying drawings, in which FIG. 1 is a block diagram of the capacitance meter;
FIG. 2 illustrates the nature of the input and output connections of a function generator which can advantageously be employed as an oscillator ;

FIG. 3 represents the real circuit arrangement of the oscillators together with the components which serve to select the measuring range, to carry out the zero-setting of the device and to adjust the linearity ;
FIG. 4 shows the integrating circuit which is employed in a particular embodiment of the device for correspondence control of the capacitance meter ;
FIG. 5 is a block diagram of a second alternative embodiment of the capacitance meter ;
FIG. 6 illustrates the waveforms at two points of an oscillator ;
FIG. 7 shows the waveforms of the control voltage Vc and the corresponding waveforms of the voltage at the terminals of the capacitor ;
FIG. 8 represents a succession of oscillograms which summarize the operation of the device shown in FIG. 5.

The block diagram of FIG. 1 serves to illustrate both the method of measurement of capacitance in accordance with the invention and the means employed for the construction of a capacitance meter in accordance with this method. A first oscillator 1 has two input terminals 14 and 16 and one output terminal 18 at which there appears a signal having a frequency $f_1$. This signal is a function, and especially a linear function, of the voltage $V_1$ which is applied to the terminal 14 by means of a voltage source 20 and of the reciprocal of the capacitance $C_1$ of the capacitor 17 which is connected between the terminal 16 and ground. A second oscillator 2 also has two input terminals 4 and 6 and one output terminal 8. Said oscillator delivers at its output 8 a signal having a frequency $f_2$ which is a function, especially a linear function, of the control voltage $V_2$ applied to the terminal 4 and of the capacitance $C_2$ which is connected between the terminal 6 and ground. A correspondence control circuit 22 is connected between the outputs of the two oscillators 1 and 2 and the voltage control input of the oscillator 2. Said circuit 22 receives the signals available at the terminals 8 and 18 at the frequencies $f_1$ and $f_2$ and generates at its output 24 a voltage which is applied to the terminal 4 of the oscillator 2. A device 26 such as a voltmeter measures the voltage available at the terminal 24 and displays this value. In a preferential embodiment, the circuit 22 comprises a phase comparator 28 which receives the signals delivered by the two oscillators and delivers a voltage $e$ which is integrated in the integrating circuit 30. The result of the integration provides the control voltage $V_2$.

It will be assumed for the sake of simplicity that the capacitance $C_2$ is the unknown capacitance which it is desired to measure and that there is no other capacitance in the oscillator 2. It will also be assumed that the function relating the frequency $f_2$ to the control elements $V_2$ and $1/C_2$ is linear ; it may therefore be written in a simplified manner :

$$f_2 = \frac{k V_2}{k' C_2}$$

where $k$ and $k'$ are positive constants of proportionality which characterize the oscillator 2. The phase comparison circuit 28 generates a voltage $e$ which is proportional to the frequency difference $f_1 - f_2$ :

$$e = K(f_1 - f_2)$$

where $K$ is a constant of proportionality. At each instant $t$, there is therefore present at the output of the integrating circuit 30 a voltage $V_2$ of the form:

$$V_2 = (1/T) \int_0^t e \, dt$$

where $T$ is the time constant of the integrator. All these values are therefore related by the differential equation:

$$dV_2/dt = (K/T) \left[ -\left(\frac{k V_2}{k' C_2}\right) + f_1 \right]$$

At equilibrium, $dV_2/dt$ is zero and the voltage is equal to $V^x$ with:

$$V^x = \frac{f_1 k' C_2}{k}$$

namely $$V^x = P C_2$$

with $$P = \frac{k' f_1}{k}$$

the voltage $V^x$ is directly proportional to the capacitance to be measured. In this particular case, the transient state is defined by the general solution of the differential equation which is:

$$V_2 = P C_2 [1 - \exp(-t/T')]$$

with $$T' = T \frac{k' C_2}{K k}$$

In practice, the real law of the variation of $f_2$ is in fact of the form:

$$f_2 = \frac{k(V_2 - V_o)}{k'(C_2 + C_o)}$$

where $V_o$ and $C_o$ are a fixed voltage and a fixed capacitance which give a value $kV_o/k'C_o$ at a frequency $f_2$ when $V_2 = C_2 = 0$ initially which naturally does not change the character of the results.

It is apparent that the functions of $C_1$ and of $C_2$ can be reversed. By way of example, this can be achieved by connecting the unknown capacitance $C_2$ in the circuit of the oscillator 1 and by connecting the capacitor $C_1$ in the circuit of the oscillator 2. The connection of $C_2$ (or the variation of $C_2$) accordingly affects the frequency $f_1$. The variation of frequency as seen from the oscillator 2 is in the direction opposite to the preceding embodiment. The control voltage $V_2$ then produces action in such a manner as to hold the frequency $f_2$ to the frequency $f_1$ while being of opposite sign. The first alternative in which the oscillator 1 has a fixed frequency $f_1$ determined by elements of fixed voltage and capacitance nevertheless has an advantage over the second embodiment since a standard oscillator is thus constituted. There would clearly not be any departure from the scope of the invention if the oscillator 1 were a reference oscillator of a type other than the controlled oscillator 2 but it remains preferable to ensure identity of nature since non-linearities and drift of the capacitance meter are accordingly reduced.

There would also be no departure from the scope of the invention if the frequency $f_2$ were not linearly dependent on the voltage $V_2$ since we should have in a more general manner:

$$f_2 = f(V_2, C_2)$$

and $$\frac{dV}{dt} = (K/T)[f_1 - f(V_2, C_2)]$$

which, at equilibrium, further results in a relation of the form $f_1 - f(V^x, C_2) = 0$ between the voltage $V^x$ and the unknown capacitance $C_2$. The transient state is then usually more complex than in the previous case.

One of the advantages of the capacitance meter in accordance with the invention, the general principle of which has just been described, is that it provides an analog output at the terminal 24; this is well suited to any subsequent control actions on the measurable variable (in the case for example in which the capacitance meter is employed in conjunction with a capacitive detector which serves to measure humidity for the control of a predetermined degree of relative humidity).

A further advantage of the capacitance meter lies in the fact that it is easy to operate and results in a compact apparatus since it calls for a small number of components which are in any case commercially available in the form of integrated circuits. It is thus advantageous to employ as oscillators 1 and 2 integrated function generators of the type shown diagrammaticlly in FIG. 2. Function generators 31 of this type have three input terminals 32, 34 and 36 and one output terminal 38. The terminal 32 corresponds to the input for the voltage control $V_c$ of the frequency of the signal emitted by the generator 31; the terminal 34 corresponds to the capacitance control input and the terminal 36 which is brought to a potential $V_A$ corresponds to an input for auxiliary voltage control through an adjustable resistance $R_1$. A generator 30 of this type delivers at its output terminal 38 an electrical signal 40 which can be, for example, a voltage in the form of square waves whose frequency $f$ is linearly dependent both on the control voltage $V_c$, on the reciprocal of the total capacitance connected to the terminal 34 and on the reciprocal of the resistance $R_1$.

By way of example, it is possible to employ the Signetics oscillator of type NE 566 or the Intersil oscillator of type 8038.

In the Signetics oscillator NE 566, for example, provision is made for two outputs which deliver triangular and rectangular waveforms. Only the output having a rectangular waveform is employed. The oscillation frequency is defined by three parameters:

— an external resistance which permits a variation in a ratio of 1 to 10,
— to a control voltage which permits a variation in a ratio of 1 to 10, — an external capacitance which permits a variation in a ratio of 1 to 100,000 ($C_x$ can range from a few picofarads to several microfarads).

All the parameters produce action linearly on the oscillation frequency.

Without describing the operation of the above-mentioned oscillator in detail, it is known to comprise (as shown in FIG. 2) a current generator 70, a Schmitt trigger 72, two amplifiers 74 and 76. The current generator 70 charges the capacitor C which is formed by the parallel assembly 2 $C_o$ and $C_x$.

In the capacitance meter, the two oscillators perform rather different functions. The oscillator 1 which constitutes the reference oscillator can be connected to a zero control voltage through a ground connection. The adjustable resistance which is placed in the auxiliary control input has a fixed value $R'_1$ and is chosen so as to obtain optimum characteristics of linearity and drift. The capacitance control input is connected to a capacitor having a value $2C_o$ if $C_o$ is the intended measurement rating of the capacitance meter : for example, $2C_o$ = 2000 pF if it is desired to carry out a measurement of capacitance between 0 and 100 pF. In the case of the oscillator 2 the control voltage can vary between 0 and 10 V, for example. The corresponding variation of frequency is in the ratio of 1 to 1.5. The value selected for the adjustable resistance $R_1$ of the oscillator 2 is in the vicinity of $R'_1$ ; this adjustment permits zero correction of the device. A capacitor having a value of $2C_o$ is connected to the corresponding terminal at the capacitance control input. The capacitance $C_x$ to be measured is connected in parallel with said capacitor having a value $2C_o$. The total capacitance thus connected therefore varies between $2C_o$ and $3C_o$ when $C_x$ increases from 0 to $C_o$. In consequence, the frequency of the oscillator varies in a ratio of 1.5 to 1. It is accordingly apparent that, at the time of connection of $C_x$, the frequency of the oscillator 2 varies and can be completely corrected solely by producing action on the control voltage $V_c$.

If there exists an internal capacitance $C_i$ in the circuits of the oscillators, the capacitor of known value which is connected in the capacitance control input must have a value $2C_o - C_i$. The fact that capacitors of high accuracy having the requisite values connot readily be provided is not a bar to the achievement of high accuracy since it is always possible to adjust the resistances $R_1$ and $R'_1$ in such a manner as to compensate for errors arising from inaccuracies of capacitors. The present Applicant has found that, taking into account the oscillators of this type which are commercially available at the present time, a total accuracy of the oroder of $10^{-3}$ over a wide range of temperatures can readily be obtained by means of the capacitance meter according to the invention.

The diagrams mentioned in the foregoing are more theoretical than practical since the capacitance meter must include components which permit adjustment of the measuring range of the apparatus. The real arrangement of the oscillators is shown in FIG. 3 and takes said components into account. In this figure, thereis shown an oscillator in the case in which use is made of a function generator of the type illustrated in FIG. 2. The same references serve to designate the elements which are common to this figure, namely the function generator 31, its three input terminals 32, 34 and 36 and its output terminal 38, there being applied to the input terminals of said generator a control voltage $V_c$, a total capacitance C' and a voltage $V_A$ through a total resistance $R'_1$. The value of capacitance C' is $2C_o-C_i+C_x$ if $C_o$ again represents the desired range of measurement, $C_i$ represents the internal capacitance of the function generator 30 and $C_x$ represents the capacitance to be measured. The control input terminal 32 is associated with a control resistance $R'_c = R_c + r_c$ where $r_c$ is constituted by a plurality of resistors 42 which can be selected by means of the switch 43. The total capacitance C' comprises a group of N capacitors 40 in parallel and selectable by means of the switch 41 which serves to establish the measurement rating. The resistance $R'_1$ is composed of a fixed resistor 47 having a value $R_1$ and of a resistor having an adjustable value $r_1$ constituted by a group of resistors 44 which can be selected by means of the switch 45.

The resistance $R'_1$ serves to provide zero correction of the device and the resistance $R'_c$ serves to adjust the sensitivity of voltage control of the oscillator 30. The switch 41 makes it possible to determine the range of measurements of the capacitance meter. This range extends from 0 to $C_o$ if $2C_o$ is the value of the capacitance $C' - C_x$; under these conditions the variation of frequency of the signal produced by the generator 30 can be wholly compensated by the variation of control voltage $V_c$. In the case of generators 30 of the type which are at present available, it is possible to obtain a frequency variation of the emitted signal in a ratio of 1 to 100,000; by means of the switch 41, it is consequently possible to adjust the range of measurement in the same ratio and, for example, from a few picofarads to several microfarads. The capacitance meter in accordance with the invention thus has a very wide range.

A further advantage of the capacitance meter which has just been described is that the analog output has a single range irrespective of the range of measurement selected, which is particularly advantageous when the capacitance meter is associated with a device for controlling the quantity to be measured.

In one advantageous embodiment, the correspondence control circuit 22 comprises a phase comparator 28 of a conventional type (by way of example, said comparator can make use of a logic circuit of the type MC 4044/4344 produced by Motorola) and an integrator 30. The constant of proportionality K which is characteristic of the comparator can always be chosen so as to be sufficiently high to ensure that the time constant of the control loop is $T' = Tk'C_2/Kk$, namely of low value, with a view to ensuring rapid reading. The voltage attains 99.9 % of its limiting value at the end of a period equal to approximately five times the constant T' , thereby approximately determining the measuring time for a degree of accuracy of 0.1 %.

By way of example, when K is adjusted so that $Kk = k'C_2$, which corresponds to $T' = T$ and in respect of a range of measurement from 0 to 10 nF, the integration time T is of the order of $2 \times 10^{-2}$ second and the measuring time is of the order of 0.1 second, which is virtually instantaneous.

An integrator in which the integration time is adjustable can also be provided, for example by making use of the circuit shown in FIG. 4. This circuit is constituted by an operational amplifier 50 associated with capacitors 52, 54, 56 which are placed in feedback and a resistor 62 having a value R. Switches 58 and 60 serve to vary the value C of the total capacitance connected to the terminals of the amplifier 50 and consequently to vary the RC integration constant of the corresponding circuit. In the case of all ranges of small amplitude, it is possible to adopt a single integration time constant as defined by the single capacitor 52, the switches 58 and 60 being open; in the case of higher ranges, the value of the capacitance can be increased by successively closing the switches 58 and 60.

The block diagram of FIG. 5 illustrates a second alternative embodiment of the capacitance meter. There are shown in this diagram a first oscillator 80 and a second oscillator 82. The oscillator 82 has a fixed frequency. The oscillator 80 is controlled by the capacitance C which is equivalent to the capacitances $C_o$ and $C_x$ in parallel and by the control voltage $V_c$. The output of the oscillators is connected to a phase comparator 84 followed by a shaping circuit 86 for the signal delivered by the comparator 84. An instrument 90 measures the means value of the voltage which appears at the output connection 88.

The principle of operation of said device is substantially the same as that of the device shown in FIG. 1 except that the signal derived from the comparator is not integrated by means of the integrator 30 as was the case with the circuit of FIG. 1 but said signal is shaped as has just been explained.

It has been seen in connection with the oscillator of FIG. 2 that the control voltage and the value of the connected capacitance produce action on the rate of charge of the connected capacitor. The threshold circuit which is incorporated in the oscillator converts the triangular charging signal to a rectangular signal. The diagram of FIG. 6 illustrates the waveforms of voltages which appear at the terminals of the capacitor C (zigzag line $V_{ch}$) and at the output of the rectangular-wave oscillator (square-wave line S).

The rectangular signals derived from the two oscillators 80 and 82 are fed into the comparator 84. Said comparator is of known type such as, for example, those in which only transitions in a given direction are taken into account and which possess a memory effect. The output of the comparator is amplified and shaped by the circuit 86 which delivers at the output 88 rectangular signals having levels +V and −V. These levels are applied to the input for the control voltage $V_c$ of the oscillator 80. Said levels control the slope of the triangular signal representing the voltage at the terminals of $C_o$ and $C_x$. This is shown in the diagram of FIG. 7. At the top portion of the diagram, the rectangular voltage $V_c$ assumes the two values +V and −V. In the case of the value +V, the variation of the voltage at the terminals of $C_o$ and $C_x$ has a high slope. In the case of the value −V, there is a low slope. As a result of this disparity in the value of slopes, the output rectangular-wave voltage of the oscillator 80 remains at the lower level over a longer period of time than at the upper level since the charge slope of the capacitor is lower in the case of −V than in the case of +V, with the result that the charge is slower than in the first case.

It accordingly follows that in this alternative embodiment, the control of frequencies always takes place in accordance with the essential characteristic feature of the invention but, since equality of frequencies (and therefore of periods) is achieved, the same waveform is not necessarily obtained at the output of the oscillators. More precisely, the waveforms represented in FIG. 8 are obtained. There is shown on the first line the voltage $V_{82}$ which appears at the output of the fixed oscillator 82. The period of this symmetrical signal is $T_{82}$ and the cyclic ratio of the rectangular signal is equal to 1/2. The second line represents the voltage $V_{80}$ which appears at the output of the variable-frequency oscillator 80. This voltage is represented in the case in which the correspondence control is no longer in a transient state and the oscillator frequencies are equal. The period $T_{80}$ of the signal $V_{80}$ is therefore equal to the period $T_{82}$ of the signal $V_{82}$, but the cyclic ratio of this rectangular wave is no longer equal to 1/2 but is dependent on the capacitance C and therefore on $C_x$. There is shown on the third line the output voltage $V_{88}$ of the capacitance meter which is at the same time the control voltage $V_c$ of the oscillator 80. The mean value $V_m$ of said voltage $V_{88}$ is proportional to the value of $C_x$. The bottom line represents the charging voltage $V_{ch}$ at the terminals of $C_x$ with its changes of slope each time $V_c$ passes from one level to the other.

The instrument 90 can simply be of the type comprising a pointer and moving frame, for example, or an integrator.

The advantage of the circuit arrangement shown in FIG. 5 is that this latter stabilizes after a few oscillator periods. In consequence, the measurement becomes very rapid, which is particularly advantageous both in the study of rapidly variable capacitances and in the study of wave motion on a water surface, for example.

In the two alternative embodiments described, when the distance between a capacitance to be measured and a capacitance meter becomes substantial, said capacitance can be connected to the capacitance meter by employing a coaxial cable having three conductors in which the outer conductor is grounded, the central conductor is connected at one end to the capacitor and at the other end to the input of a cathode-follower which possesses a gain of 1 and the output of which is connected to the intermediate conductor. The input of the capacitance meter is then coupled with the input of said cathode-follower amplifier.

The capacitance meter which has just been described finds a large number of applications which can be placed in two classes:

a. application to the metrology of capacitors: the capacitance meter of the invention possesses numerous advantages which have been mentioned earlier, namely accuracy, linearity, broad range, analog output. Said output can in any case be readily made numerical if the need arises by adapting to the device an instrument for the numerical measurement of the voltage which appears at the terminal 24 of FIG. 1, for example by replacing the analog voltmeter 26 by a digital voltmeter of known type. The capacitance meter of the invention can therefore be adapted in a general manner to analog or digital multi-meters;

b. application to the measurement of any physical phenomenon which can be represented by a capacitance or a variation of capacitance. There can be mentioned by way of example the measurement of moisture in paper or in other materials, the measurement of level of a liquid or the flow rate of a fluid, the measurement of linear or angular displacements (without contact), the study of motion of a liquid, the detection of proximity, and so forth.

What we claim is:

1. A method of analog measurement of a capacitance and/or a variation of capacitance in which use is made of two electric oscillators whose frequency is dependent on a capacitance connected thereto and in which the unknown capacitance is connected in the circuit of one of the oscillators, wherein:

two oscillators are selected so as to have a frequency which is dependent both on the capacitance introduced in their circuit and on a control voltage, said capacitance being independent of said control voltage, the two oscillators are initially adjusted so as to ensure that their frequencies are equal, the capacitance to be measured is connected in the circuit of one of the oscillators, thereby modifying its frequency, the control voltage of either of the two oscillators is modified without changing said capacitance introduced into the circuit of such oscillator so as to reduce the frequency difference between the two oscillators to zero, said control voltage as thus modified is measured and the value of said capacitance is deduced therefrom.

2. A method according to claim 1, wherein oscillators are selected so as to ensure that their frequency is linearly dependent on the reciprocal of the capacitance connected thereto and linearly dependent on the control voltage.

3. A method according to claim 1, wherein:

a fixed capacitance is connected in the circuit of a first oscillator and a fixed control votlage is applied to said first oscillator, the capacitance to be measured is connected in the circuit of a second oscillator, thereby modifying its frequency, the control voltage of said second oscillator is modified so as to bring the frequency of the second oscillator to the frequency of the first oscillator which is taken as a reference.

4. A method according to claim 1, wherein:

the frequencies of the two oscillators are compared, an error voltage is generated and is proportional to the difference between the two frequencies, said error voltage is integrated, thereby supplying the control voltage for the second oscillator.

5. A method according to claim 3, wherein use is made of oscillators which deliver square-wave signals and wherein:

the frequencies of said square-wave signals are compared, there is produced on the basis of the result of said comparison a rectangular-wave voltage having a level which is alternately +V and −V, said rectangular-wave voltage is employed as control voltage for the second oscillator, the mean value of said control voltage is measured and this gives the value of the capacitance connected in the circuit of the controlled oscillator.

6. An analog capacitance meter for carrying out the method according to claim 1 of the type comprising two oscillators whose frequencies are dependent on the capacitances which are present in the circuit of said oscillators, wherein said capacitance meter comprises:

two oscillators each having at least two inputs, one of which is a voltage control input, and one output which delivers a signal whose frequency is dependent on the voltage applied to the voltage control input and on the capacitance connected to the capacitance control input, the capacitance connected to said capacitance control input being independent of the voltage applied to said voltage control input, a correspondence control circuit for controlling the frequency of either of the oscillators in dependence on the frequency of the other oscillator and connected to the outputs of both oscillators, the output of said circuit being intended to deliver a voltage which is the control voltage for the frequency-controlled oscillator, a voltmeter for measuring said control voltage which is supplied by said correspondence control circuit.

7. A capacitance meter according to claim 6, wherein:

in the case of said first oscillator, the voltage control input is brought to a fixed potential and the capacitance control input is connected to a fixed capacitor, in the case of said second oscillator, the capacitance control input is connected to the capacitance to be measured and the voltage control input is connected to the output of said correspondence control circuit.

8. A capacitance meter according to claim 6, wherein each oscillator delivers a signal whose frequency is linearly dependent on the voltage and on the reciprocal of the control capacitance, the indication of the voltmeter being in that case linear as a function of the measured capacitance.

9. A capacitance meter according to claim 6, wherein said correspondence control circuit comprises on the one hand a phase comparison circuit which receives the signals emitted by the two oscillators and delivers a voltage which is proportional to the frequency difference between the two oscillators and on the other hand an integrating circuit which is connected to the output of said phase comparator and the output of which is connected to the voltage control input of the controlled oscillator.

10. A capacitance meter according to claim 7 wherein:

a first capacitor having a value $2C_o$ and connected to the capacitance control input of the first oscillator, the voltage control input of said first oscillator being connected to ground, a second capacitor having a value $2C_o$ and connected to the capacitance control input of said second oscillator, the capacitance to be measured being connected in parallel with said second capacitor, the measurement rating of said capacitance meter being accordingly equal to $C_o$.

11. A capacitance meter according to claim 8, wherein each oscillator is provided in addition with a third input which is brought to a fixed voltage and comprises an adjustable resistance, the period of the oscillator being linearly dependent on the value of said resistance.

12. A capacitance meter according to claim 10, wherein each of said first and second capacitors having a value $2C_o$ is constituted by N capacitors in parallel which are selectable by means of a switch and define N measurement ratings of the capacitance meter.

13. A capacitance meter according to calim 6, wherein the voltage control input of the frequency-controlled oscillator comprises a variable resistor for adjusting the sensitivity of the control voltage.

14. A capacitance meter according to claim 6, wherein said oscillators are periodic function generators.

15. A capacitance meter according to claim 14, wherein said generators deliver a square-wave voltage.

16. A capacitance meter according to claim 9, wherein said integrating circuit comprises an operational amplifier associated with P switchable capacitors mounted in feedback and defining P values of the integration time.

17. A capacitance meter according to claim 7, wherein the oscillators are of the type which emit a square-wave signal and wherein said correspondence control circuit comprises a phase comparator for rectangular-wave signals, a shaping circuit which is controlled by said comparator and delivers a rectangular-wave voltage having a level alternately of +V and −V, said voltage being applied to the voltage control input of said second oscillator, said measuring voltmeter being a device for measuring the mean value and being connected to the output of said shaping circuit.

* * * * *